United States Patent [19]

Misumi et al.

[11] 3,833,457

[45] Sept. 3, 1974

[54] POLYMERIC COMPLEX COMPOSITE

[75] Inventors: Teruyuki Misumi, Yokohama; Yutaka Shimodoi; Kazushi Ochi, both of Osaka, all of Japan

[73] Assignee: Asahi Kasei Kogyo Kabushiki Kaisha, Osaka, Japan

[22] Filed: Mar. 17, 1971

[21] Appl. No.: 125,366

[30] Foreign Application Priority Data

Mar. 20, 1970 Japan.............................. 45-23080

[52] U.S. Cl....... 161/170, 117/138.8 A, 117/161 R, 117/161 UZ, 161/187, 260/79.3 R, 260/79.3 MU, 252/8.7
[51] Int. Cl............................................ B32b 33/00
[58] Field of Search........ 161/187, 170; 260/79.3 R, 260/79.3 MU, 49; 252/8.7; 117/161 R, 161 UZ, 138.8 A

[56] References Cited
UNITED STATES PATENTS

| | | | |
|---|---|---|---|
| 2,676,896 | 4/1954 | Cohen............................ | 260/79.3 R |
| 3,137,668 | 6/1964 | Kuppers......................... | 260/79.3 R |
| 3,153,021 | 10/1964 | Tashlick et al................. | 260/79.3 R |
| 3,242,146 | 3/1966 | Meister......................... | 260/79.3 MU |
| 3,312,665 | 4/1967 | Caldwell et al................ | 260/79.3 R |
| 3,320,218 | 5/1967 | Levine........................... | 260/79.3 R |
| 3,328,367 | 6/1967 | Rees.............................. | 260/79.3 MU |
| 3,446,651 | 5/1969 | Clachan et al................. | 260/79.3 R |
| 3,507,829 | 4/1970 | Bostick et al.................. | 260/79.3 R |

Primary Examiner—Harold Ansher
Assistant Examiner—Ellis P. Robinson
Attorney, Agent, or Firm—Craig & Antonelli

[57] ABSTRACT

A polymeric complex composite having an improved hydrophilic property is presented. The polymeric complex composite is made from a polymeric substrate of a conventional polymeric material and a coating tightly adhered to the surface of the substrate. The coating contains 900 millimoles or more of sulfonic acid groups and 5 millimoles or more of sulfone bridges per 1 kg of the coating. The structure of the coating is a three-dimensional network. The polymeric complex composite has an excellent anti-electrostatic property as well as other improved properties such as excellent water absorption, soil release, dyeing properties and the like. Such improved properties are not temporary but durable. The polymeric complex composite is suitable for uses for various articles, particularly for fibers and films.

21 Claims, No Drawings

POLYMERIC COMPLEX COMPOSITE

This invention relates to a novel polymeric complex composite. More particularly, this invention relates to a polymeric complex composite which consists of a polymeric composite selected from conventional polymeric materials and, adhered thereon, an insoluble and infusible coating of a crosslinked polymer containing free sulfonic acid groups and/or salts thereof and sulfone crosslinks.

Synthetic fibers and synthetic resins have recently been used widely in many fields. But some of them, for example, polyethylene, polypropylene, ABS resin, polystyrene, polyacrylonitrile, polymethacrylic acid ester, polyacetal, polyester, polyamide, or the like, are relatively hydrophobic. They had therefore many drawbacks such as bad surface diffusibility of water, bad water absorption property, whereby caused such unfavorable phenomena as easy static electrical charging, bad soil release property, difficulty in dyeing etc.

In order to improve the drawbacks as mentioned above of the hydrophobic polymeric substrates, there have been made various proposals. Typical examples are (1) the method of using a monomer having sulfonic acid group as a component in copolymerization or cocondensation for producing synthetic resins or fibers, (2) the method of blending a polymer containing sulfonic acid groups with synthetic resins or fibers, and (3) the method of adhering a polymer containing sulfonic acid groups onto the surface of synthetic resins or fibers. However, the method (1) has the drawbacks such as bad physical properties of the copolymer obtained, poor copolymerizing property of different monomers, difficulty in melt spinning on account of instability to heat of the polymer containing sulfonic acid groups, or the like. The method (2) has the drawbacks such as poor compatibility of synthetic resins or fibers with polymers containing sulfonic acid groups, impossibility of melt spinning on account of the instability to heat of the polymer containing sulfonic acid groups, or the like. The method (3) has also the drawbacks such as poor adhesion between the substrates of the synthetic resins or fibers and the polymer containing sulfonic acid groups, easily soluble and easily coloring properties of laminated polymers containing sulfonic acid groups, or the like.

The present inventors have now found a novel polymeric complex composite having various characteristics which could not be attained by techniques of the prior art.

The polymeric complex composite according to the present invention has the structure wherein coatings of the polymer having sulfonic acid groups and/or salts thereof (hereinafter referred to simply as "sulfonic acid groups") are crosslinked to form insoluble and infusible three-dimensional networks, and the coatings are tightly adhered onto the surface of conventional polymeric substrates. Accordingly, the surface characteristics of the polymeric complex composite of the present invention are enhanced due to the hydrophilic effect imparted by the hydrophilic groups contained in the three-dimensional polymers forming coatings. The present polymeric complex composite is improved in such properties as surface diffusibility of water, water absorption property, antielectrostatic property, dyeing property (particularly by basic dyes) or the like. Surface diffusibility of water is improved about 5 – 100 times as compared with that of conventional ones. Water absorption is also practically improved.

As for antielectrostatic property, a conventional polymeric substrate, for example, obtained from synthetic high polymeric materials (having such forms as molded articles, films, fibers or the like) has a surface resistivity more than $10^{13}$ ohm at 20°C. in an atmosphere of 40 percent relative humidity. If these substrates are wound around rotatory drums and frictioned with cotton, leather or the like, static charge with a voltage more than 2,000 volt is accumulated on the surface. Besides, the rate of diminishing of the accumulated charge is extremely small, i.e., more than 120 sec in terms of half-value period. In practical applications, therefor, they involve the drawbacks such as 'spark discharge,' 'twining,' 'unpleasant feeling of electric shock,' 'arise of discharging sound,' 'easily contaminated and hardly cleaned' or the like. The surface resistivity of the polymeric complex composite according to the present invention is $10^{11}$ ohm or less. The static charge voltage and the diminishing rate thereof are 200 volt or less and 1 sec or less, respectively, as measured by the same method mentioned above. Therefore the present polymeric complex composite has no such drawbacks as mentioned above.

Concerning contamination properties, an excellent soil release property is effected. Particularly, the property in removing stain contamination or preventing recontamination is extremely good.

The polymeric complex composite according to the present invention made from hydrophobic polymeric substrates which can hardly be dyed by conventional techniques of dyeing can be easily dyed. Those made from polymeric substrates which can not be dyed by basic dyes can also easily be dyed.

The coatings formed on the surface of substrates in the polymeric complex composite of the present invention are combined strongly with the polymeric substrates and have a three-dimensional insoluble and infusible chemical structure. Accordingly, the coatings have extremely excellent thermal, chemical and mechanical stabilities. In other words, the coatings of the polymeric complex composite of the present invention are extremely excellent in thermal resistance, solvent resistance, friction resistance, washing resistance, ironing resistance or the like. The aforesaid improved properties do not substantially change even after repeated use, cleaning in water or organic solvents (for example, ordinary washing, dry cleaning) or the like. For instance, the surface resistivity of the polymeric complex composite of the present invention is $10^{11}$ ohm or less even after 10 times repeated washing which is substantially the same as before washing.

An object of the present invention is to provide a polymeric complex composite having improved antielectrostatic property, as well as many other improved properties. Another object of the present invention is to provide a method to impart hydrophilic property to the hydrophobic conventional synthetic resins or fibers which is permanent in nature and maintains its original hydrophilic property as ever. The other object is to provide various articles shaped in a variety of forms made from the polymeric complex composite of the present invention. Further objects will appear in the following description hereinafter disclosed.

The present invention provides a polymeric complex composite consisting of a polymeric substrate selected from conventional polymeric materials and a coating having a structure containing 900 millimoles or more/kg-coating of free sulfonic acid groups. The coating is an insoluble and infusible three-dimensional crosslinked polymer, crosslinked by a portion of said sulfonic acid groups and other crosslinking functional groups. The coating is characterized in that it contains sulfonic acid groups (either free sulfonic acid or salts thereof) together with sulfone bridges. Accordingly, the polymers forming coatings (hereinafter referred to as polymers for coatings) on the surface of polymeric substrates may be prepared according to a process (1) which comprises forming intermolecular as well as intramolecular crosslinkages by using a linear polymer containing both sulfonic acid groups and other groups suitable for formation of sulfone bridges ($—SO_2—$) through reaction with said sulfonic groups (hereinafter referred only as 'crosslinking groups'). Alternatively, the polymers for coatings may be prepared according to a process (2) which comprises forming intermolecular crosslinkages by using a linear polymer containing sulfonic acid groups and no other crosslinking groups together with a linear polymer containing other crosslinking groups and no sulfonic acid groups. Further, the polymers for coatings may be prepared according to a process (3) wherein the processes (1) and (2) as mentioned above are combined, i.e., three types aforesaid linear polymers are used.

In order to obtain the effect of the present invention, particularly to impart the durable character to the improved physical properties, it is required that the coating contains at least 5 millimoles of sulfone bridges per 1 kg of the coating. If the amount of the bridges is more than 20 millimoles per 1 kg of coating, the effect obtained is particularly prominent.

It is further required that a large amount of sulfonic acid groups should remain unaltered after the crosslinking reaction except a portion of said groups is consumed for said crosslinking reaction. If all of the sulfonic acid groups are consumed for the crosslinking reaction, the objective improvement of various physical properties cannot be achieved. More specifically, the effect obtained is not practical if 900 millimoles or more of sulfonic acid groups are not present per 1 kg of coating. The effect is extremely prominent if 1350 millimoles or more of sulfonic acid groups are present per 1 kg of coating.

The polymers for forming the coating may further contain side chains of other substituent groups (hereinafter referred to simply as "other substituent groups") other than said sulfonic acid groups or crosslinking groups. However, the "other substituent groups" may be contained in an amount within the following relative numerical limitations for the ratios of the groups, i.e.

$\alpha = X/X + Y = 0.05 - 0.95$
$\beta = X + Y/X + Y + Z = 0.10 - 1.00$ wherein, X represents the number of side chains having sulfonic acid group, Y represents the number of crosslinking groups, and Z represents the number of other substituent groups.

The preferable values of said ratios are that $\alpha$ is 0.30 – 0.90 and $\beta$ is 0.80 – 0.90.

The present invention will now be precisely explained.

1. Substrates

The polymeric substrates which can be used in the present invention may be any of the well-known conventional fibers and resins, which may be either natural or synthetic. They may include polyethylene, polypropylene, polyisobutylene, polystyrene, polyxylene, unsaturated polyesters, polyvinyl chloride, polyvinylidene chloride, polyvinyl fluoride, polyacrylic acid esters, polyethers, polycarbonates, epoxy resins, urea resins, phenol resins, silicone resins, ABS resins, polyamides, polyacrylonitrile, vinyl chloride-vinyl acetate copolymers, polyesters, cellulose, cellulose acetate, wool, casein, and regenerated cellulose. The polymers mentioned above may be either homopolymers or copolymers with other comonomers. For example, the above 'polyethylene' includes both homopolyethylene and a copolymer obtained by copolymerizing ethylene as the main component with other comonomers.

The substrates used in the present invention may also include the shaped articles obtained from the aforesaid polymers as well as the first order finished products or the second order finished products thereof. For example, sheet-shaped articles, rod-shaped articles, column-shaped articles, porous articles, fibers, filaments, strands, tapes, ribbons, cloths or the like may be included. Further, textile end products such as white shirts, socks, over- or underclothes or the like, molded resin articles such as blades of fans or other fixtures or parts and the like may also be used.

2. Coatings

Typical polymers for coatings

Polymer A: This polymer which may be used alone for the laminates of the present invention may be prepared by addition polymerization or condensation polymerization of a mixture containing a monomer having a sulfonic acid group and a monomer having a crosslinking group. This polymer may also be prepared by incorporating sulfonic acid groups to the basic polymer which is obtained by addition polymerization or condensation polymerization of a mixture containing a monomer having a group capable of being attached with said sulfonic acid groups after polymerization and a monomer having a crosslinking group. In either preparation method, other monomers having other substituent groups may also be involved, if desired.

(1) Preparation of Polymer A by addition polymerization

Monomers: (a) The monomers having sulfonic acid groups may include vinyl sulfonic acid, methallyl sulfonic acid, 2-sulfoethyl methacrylate, styrene sulfonic acid, vinyl toluene sulfonic acid and the like. The esters or amides of said monomers may also be employed, but in such case the polymer obtained needs to be hydrolyzed to obtain sulfonic acid groups.

(b) The monomers having a crosslinking group may generally include a monomer having aryl groups or derivatives thereof, hydroxyl groups or thiol groups, or a monomer containing monovalent residual groups having hydroxyl groups or thiol groups. For example, styrene, vinyl toluene, α-methylstyrene, ar-dimethyl styrene, ar-ethyl styrene, ar-hydroxy styrene, ar-amino styrene, vinyl naphthalene, ar-sec-butyl styrene, ar-trimethyl styrene or the like may be used.

(c) The monomers having other substituent groups other than said monomers (a) and (b) may include those having such substituent groups as halogen, nitrile, carboxylic acid, carboxylic acid ester, ketone and the like. A monomer having no such substituent groups, for example, ethylene may also be used.

(d) The monomers capable of being attached with sulfonic acid groups after polymerization may include styrene, α-methyl styrene, vinyl toluene, vinyl naphthalene, and the like.

Polymerization: As a polymerization method, either thermal polymerization, radical polymerization, or ionic polymerization, may be conducted. The polymerization system may be any of bulk polymerization, solution polymerization, emulsion polymerization, or suspension polymerization.

(2) Preparation of Polymer A by condensation polymerization

Monomers: (a) The monomers having sulfonic acid groups may include phenol sulfonic acid, benzaldehyde-2,4-disulfonic acid, naphthol sulfonic acid, p-oxybenzyl sulfonic acid and the like.

(b) The monomers having a crosslinking group may include phenol, resorcin, hydroquinone, cresol, thiophenol and the like.

(c) The coupling agents for the monomers (a) and (b) may include such aldehydes as formaldehyde, acetaldehyde, glyoxal, benzaldehyde, trioxane and the like.

(d) Similarly as in addition polymerization, monomers such as phenol, resorcin or the like may be used as the monomers capable of being attached with sulfonic acid groups after polymerization.

In the case of the condensation polymerization, the coupling agents may be used in an amount corresponding to the molar ratio of (coupling agent)/(monomer for imparting sulfonic acid group + monomer for imparting crosslinking group) which is within 1.0.

When Polymer A is prepared according to the procedure wherein sulfonation reaction is applied to the polymer after polymerization, there may be used sulfonating agents such as conc. sulfuric acid, chlorosulfonic acid, sulfuric acid anhydride, addition product of sulfuric acid anhydride-dioxane, addition product of sulfuric acid anhydride-ethyl ether, or the like. In said sulfonation reaction, such solvents as ethylene chloride, tetrachloro-ethane, monochlorobenzene, perchloro ethylene or the like may also be used.

In the preparation of Polymer A according to the procedure wherein the basic polymer is sulfonated after polymerization, preferable polymers are obtained by sulfonating partially a homopolymer, a copolymer or a graft polymer which are obtained by polymerizing a monomer having an aromatic ring such as styrene together with, if desired, other monomers having other substituent groups. For example, polystyrene which is sulfonated to a sulfonation degree of 80 percent is one of such preferable polymers.

Polymer B: This polymer may be used combined with Polymer A mentioned above and/or Polymer C hereinunder described. This polymer may be prepared from a monomer containing sulfonic acid groups through condensation polymerization or addition polymerization. It may also be prepared by incorporating sulfonic acid groups to the basic polymer which is obtained by addition polymerization or condensation polymerization of a monomer having a group capable of being attached with said sulfonic acid groups after polymerization. In either preparation method, other monomers having other substituent groups may also be involved, if desired.

Monomers: The monomers used for the preparation of Polymer B may include the monomers (1) (a) and (2) (a) containing sulfonic acid groups used for the preparation of Polymer A. Similarly as in Polymer A, the monomers (1) (c), (1) (d), (2) (c), (2) (d) may also be used for Polymer B. In the condensation polymerization, the coupling agent is used in an amount corresponding to the ratio of (coupling agent)/(monomer for imparting sulfonic acid group) which is within 1.0. Polymer B may also be prepared by sulfonating the basic polymer after polymerization according to the same procedure as described in the case of Polymer A, but the sulfonation degree is 100 percent.

Polymer C: This polymer may be used combined with Polymer A and/or Polymer B described above. This polymer may be prepared from the monomers (1) (b) through addition polymerization, or alternatively from the monomers (2) (b) through condensation polymerization with coupling agents (2) (c). In said condensation, the coupling agent is used in an amount corresponding to the ratio of (coupling agent)/(monomer for imparting crosslinking group) which is within 1.0.

Among the polymers for the coatings described above, preferable polymers in view of easy availability and physical properties thereof such as antielectrostatic property and permanent characteristic thereof are partially sulfonated products of the polymers having the pendant benzene rings wherein no substituent groups are attached in the para position to said benzene rings, i.e. schematically

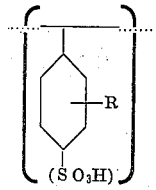

(wherein (—SO₃H) signifies that the benzene rings contained in the polymer are partially sulfonated, R represents the substituent groups other than hydrogen and sulfonic acid group, and ... — .... signifies the main chain of the polymer). Particularly preferable polymer of such polymer is partially sulfonated polystyrene.

(3) Process for preparing the polymeric complex composite of the present invention In adhering the coatings to the surface of the substrates, there is no requirement for the state of the substrates. That is, the substrates may be used either before or after dyeing and they may be either wetted or dried. These conventional substrates are first contacted with the polymer for the coatings as described above. The method of said contacting may be either by way of dipping, coating, spraying or the like. Even electrodeposition method may be applied. The polymers for the coating may be used either in an aqueous solution, an organic solution, an emulsion, or a suspension.

The coating is effected ordinarily at 0° – 120°C. When the outdoor temperature is below 0°C, the coating may be effected at such low temperature and there is no need to elevate the temperature of the reaction system. The conditions of coating such as coating temperature, concentration of the polymers for laminates, pH, coating period or the like may suitably be selected according to the physical or chemical properties of the polymeric substrates and the polymers for coatings.

After the coating procedure is completed, the excessive polymer for the coating on the polymeric substrates are removed by means of squeezing, standing or the like before subjecting the coating substrates to the heat treatment. The heat treatment is carried out using a method whereby the remaining solvents may easily be removed either through volatilization, evaporation, or the like from the polymers for coatings adhered on the surface of the polymeric substrates. The heat treatment may be effected at a temperature in the range of 80° – 300°C. The heating period is from several seconds to several hours. The conditions for the heat treatment such as heating temperature or heating period may suitably be determined according to the physical or chemical properties of the polymers for coatings and the polymeric substrates. As the result of the heat treatment, the polymers for coatings are crosslinked in a three-dimensional network by forming sulfone bridges, and become insoluble and infusible.

It should further be noted that the acid groups contained in the polymers for coatings are preferably H-type. In other words, if $H^+$ ions in the acid groups are substituted with metal ions such as $Na^+$, $K^+$, $Ca^{++}$, $Mg^{++}$, $Fe^{++}$, $Fe^{+++}$, or $Al^{+++}$, ammonium ions such as $NH_4^+$, $N(CH_3)_4^+$, or amino ions, the degree of crosslinking reaction is decreased and the effect of the present invention cannot be obtained.

The polymeric complex composite obtained after the completion of the heat treatment according to the present invention may be contacted with any kind of electrolyte substances. The $H^+$ ions of the acid groups which are not involved in the crosslinking reaction are thereby equilibrated with the outer solution and exchanged with the ions contained therein.

The present invention will now be explained in further detail by referring to the following examples, wherein 'percent' denotes 'percent by weight', if not otherwise noted.

Example 1

The surface of an extruded polyethylene terephthalate film (molecular weight: 20,000) having a thickness of 0.1 mm was coated by means of a sprayer with a 3 percent aqueous solution of polystyrene sulfonic acid (molecular weight: 200,000, sulfonation degree: 78 percent by molar ratio of the sulfonated benzene rings) sulfonated by the addition product of dioxane-sulfuric acid anhydride in an amount of 20 cc/m² per each surface.

The coated film was dried in a hot air stream at 80°C. for 60 seconds to solidify uniformly the adhesion of said sulfonic acid to the surface. The dried film was further subjected to heat treatment in a hot air stream at 200°C. for 30 seconds. Subsequently, the treated film was immersed in a 1 percent aqueous sodium carbonate solution for 20 seconds for neutralization, washed with cold water for a while and dried in air at room temperature. The thus obtained polyethylene terephthalate film had an extremely excellent antielectrostatic property which remains substantially unaltered even after the treatments such as with hot water, Perclene (trade mark of perchloroethylene produced by Du Pont Co.) or the like. On the contrary, when the coated film mentioned above was dried at 80°C. and thereafter directly neutralized, washed and dried without being subjected to the heat treatment at 200°C. for 30 seconds, the obtained film showed none of such antielectrostatic property. The antielectrostatic properties of the treated and the untreated films are shown in Table 1.

Table 1

| Sample 1 | Surface resistivity[2] ($\times 10^{10}$ ohm) | Friction static charge voltage[3] (V) | Half-value period of friction static charge voltage[4] (sec) |
| --- | --- | --- | --- |
| Polyethylene terephthalate film of the present invention | 0.3[1] | +15 | 1 or less |
| The same film[5] after treated in hot water | 1.2[1] | +30 | 1 or less |
| The same film[6] after treated in Perclene | 0.9[1] | +17 | 1 or less |
| The film without the heat treatment at 200°C. for 20 seconds | 1,000 or more[1] | +1,500 | 76 |
| Untreated film | 1,000 or more[1] | +2,000 | 120 or more |

Note:
[1] measured at 20°C. in an atmosphere of 40 percent relative humidity
[2] measured by Electric micro-micro-ammeter (made by Takeda Riken Co.)
[3] voltage of the friction charge accumulated after the sample was frictioned with cotton cloth for 1 minute using Rotary static tester (made by Kōa Shōkai Co.) at 700 RPM
[4] time needed for the reduction of the friction charge voltage of [3] until half of its original value
[5] after treated in boiling water for 60 minutes, and dried in air
[6] after immersed in Perclene at 40°C. for 60 minutes, and dried in air Example 2

An extruded rod-shaped polystyrene resin (molecular weight: 250,000) having a radius of 1.5 cm was dipped in a 3 percent aqueous solution of poly-α-methylstyrene sulfonic acid (sulfonation degree: 83 percent) which was obtained by sulfonating poly-α-methylstyrene resin (average molecular weight: 1,200) with a complex compound of dioxanesulfuric acid anhydride. The rod was taken out of the solution after 5 seconds and dried in an air stream at 60°C. for 60 seconds. Then, the rod was further subjected to the heat treatment in hot air at 160°C. for 120 seconds. Subsequently, the treated rod was neutralized in a 1 percent aqueous sodium carbonate solution for 10 seconds, thoroughly washed in cold water and dried in air at room temperature. The thus obtained rod-shaped polystyrene resin was frictioned with cotton cloth, wool cloth, 6-nylon taffeta, and polyethylene terephthalate taffeta, respectively, at 20°C. in an atmosphere of 40 percent relative humidity. Each friction was conducted by hand 10 times. Immediately thereafter, the frictioned rod was placed at a distance of 3 cm from cigarette ashes. In each case it was observed that there was no ash adsorption. On the contrary, in the case of the untreated rod-shaped polystyrene resin, a considerable amount of ash adsorption was observed even at a distance of 6 cm from the cigarette ashes after frictioned with any of the cloths mentioned above.

Example 3

A polyester taffeta fabric made of 70 denier (24 filaments) polyethylene terephthalate fibers, both longitudinally and transversely, was immersed at 20°C. in a 2.5 percent aqueous solution of polystyrene sulfonic acid (average molecular weight: 100,000; sulfonation degree: 80 percent) and then the absorbed liquid was squeezed off therefrom (Degree of squeezing =

(the weight of cloth after squeezing) - (the weight of untreated cloth)/the weight of untreated cloth × 100

= 35 percent).

The squeezed cloth was dried at 70°C. for 60 seconds and the further subjected to the heat treatment at 190°C. for 120 seconds. Subsequently, the treated cloth was neutralized in a 0.3 percent aqueous sodium acetate solution at 40°C. for 20 seconds, thoroughly washed with water and dried at 70°C. for 60 seconds. The obtained polyester taffeta exhibited excellent antielectrostatic property which did not change substantially even after repeated washing or dry cleaning. The result is given in Table 2 in comparison with that of the untreated taffeta.

Table 2

Comparison with the untreated cloth[7]

| Sample | Surface resistivity (× $10^{10}$ ohm) | Friction static charge voltage (V) | Half-value period of friction static charge voltage (sec) |
|---|---|---|---|
| Polyester taffeta of the present invention | 0.2 | 8 | 1 or less |
| The same[8] taffeta after washing | 1.0 | 19 | 1 or less |
| The same[9] taffeta after dry cleaning | 0.4 | 11 | 1 or less |
| Untreated taffeta | 1,000 or more | 2,000 or more | 120 or more |

Note:
[7]measured by using the same measuring instrument as in Table 1, but in an atmosphere of 20°C. and 65 percent relative humidity.
[8]washed in a household reverse-type washing machine, one cycle being a washing at 40°C. for 5 minutes using New Beads (made by Kaō Sekken Co.) in the conc. of 2 g/l and a rinsing with cold water at 20°C. for 6 minutes.
[9]after treated in a Perclene bath containing 0.2 percent Gembukulin (made by Daiichi Kōgyō Seiyaku Co.) at a bath ratio of 1:50 at normal temperature for 30 minutes, and dried at normal temperature.

Example 4

Polystyrene having an average molecular weight of 100,000 was sulfonated to obtain four species of sulfonated polystyrene, i.e. 5, 30, 60, and 98 percent sulfonated polystyrenes. Separately, three species of polystyrenes having different polymerization degree, i.e. polystyrenes with molecular weight of about 600, 10,000, and 50,000, were sulfonated to a sulfonation degree of 80 percent to obtain three species of polystyrene sulfonic acids. These seven species of polystyrene sulfonic acids were made into a 2.5 percent solution. Methanol was used as a solvent for the polystyrene sulfonic acid with sulfonation degree of 5 and 30 percent and water for the highly sulfonated ones. The same treatments as described in Example 3 were repeated using these various solutions to give the following results as shown in Table 3.

As clearly seen in the Table listed above, every one of the composites according to the present invention has an excellent enduring property.

Films were casted from each solution used in the present example and they were subjected to the same heat treatment as described above at 190°C. for 120 seconds. Then, the remaining sulfonic groups were determined quantitatively by means of neutralization titration. By using the same films, swelling test was conducted in water to determine indirectly the degree of sulfone bridge. The result of these analyses are shown in Table 4.

Table 3

| No. | Sulfonation degree (%) | Average molecular weight | Surface resistivity (× $10^{10}$ ohm)[10] | | Friction charge voltage (V)[10] | | Half-value period (sec)[10] | | Remarks |
|---|---|---|---|---|---|---|---|---|---|
| | | | $W_0$[11] | $W_{10}$ | $W_0$ | $W_{10}$ | $W_0$ | $W_{10}$ | |
| 1 | 5 | 100,000 | 2.5 | 42 | 50 | 370 | 2 | 8 | outside of the scope of the present invention |
| 2 | 30 | 100,000 | 0.6 | 0.9 | 8 | 10 | 1 or less | 1 or less | within the scope of the present invention |
| 3 | 60 | 100,000 | 0.3 | 0.5 | 7 | 12 | 1 or less | 1 or less | do. |
| 4 | 98 | 100,000 | 30.0 | 570 | 140 | 780 | 6 | 80 | outside of the scope of the present invention |
| 5 | 80 | 600 | 4.0 | 97 | 70 | 530 | 3 | 23 | do. |
| 6 | 80 | 10,000 | 0.3 | 0.6 | 12 | 11 | 1 or less | 1 or less | within the scope of the present invention |
| 7 | 80 | 50,000 | 0.5 | 0.7 | 9 | 13 | 1 or less | 1 or less | do. |

Note:
[10]measured by using the same measuring instrument as in Table 1, but in an atmosphere of 20°C. and 65 percent relative humidity.
[11]$W_0$ is the value measured immediately after the treatment, $W_{10}$ is the value after 10 cycles of repeated washing, said cycle being the same as described in Table 2.

Table 4

| No. | Sulfonation degree (%) | Average molecular weight | Sulfonic acid group (millimol/kg film) | Sulfone bridge[12] (millimol/kg film) | Remarks |
| --- | --- | --- | --- | --- | --- |
| 1 | 5 | 100,000 | 400 | 5 or less | outside of the scope of the present invention |
| 2 | 30 | do. | 1,900 | 30 | within the scope of the present invention |
| 3 | 60 | do. | 3,250 | 75 | do. |
| 4 | 98 | do. | 4,910 | 5 or less | outside of the scope of the present invention |
| 5 | 80 | 600 | 4,170 | 15 | do. |
| 6 | 80 | 10,000 | 4,030 | 60 | within the scope of the present invention |
| 7 | 80 | 50,000 | 4,110 | 45 | do. |

Note:
[12] the amount of the sulfone bridge was estimated from the swelling ratio in water from swelling ratio-crosslinking degree lines which were obtained by measuring the swelling ratios of standard films prepared from styrene, potassium styrene sulfonate, and divinyl benzene, said crosslinking degree being calculated from the definite proportions of the monomers.

Table 4 shows that the examples of the present invention have more than 20 millimol/kg-coating of sulfone bridges formed in the matrix of the coating.

Example 5

A mixture of vinyl sulfonic acid phenyl ester with styrene mixed at a ratio of 1.77:1 was bulk polymerized using 1.0 percent of azobisisobutyronitrile. A linear polymer having an average molecular weight of 130,000 was obtained. This polymer was hydrolyzed in a 10 percent caustic soda ethanolic solution at 100°C. under pressure over 10 hours. After ethanol was stripped from the reaction mixture, the reaction product was thrown into water and successively passed through a column of active charcoal and a mixed-bed column of cation-exchange resin and anion-exchange resin. The purified polyvinyl sulfonic acid-styrene copolymer thus obtained was then formed into a 2 percent aqueous solution.

Into this aqueous solution was dipped at 20°C. 6-nylon de Chine fabric woven from 70 denier multifilaments (24 filaments), both longitudinally and transversely. Then, the absorbed liquid was squeezed off from the fabric (degree of squeezing = 40 percent). After the fabric was dried at 70°C. for 2 minutes, it was subjected to the heat treatment at 160°C. for 60 seconds. The treated fabric was thereafter neutralized with a 0.1 percent ethanolic solution of caustic soda at 20°C. for 30 seconds, thoroughly washed with water, and dried in air for 2 minutes. The thus obtained 6-nylon de Chine fabric possesses an extremely excellent antielectrostatic property and permanent characteristic thereof, as shown in Table 5. The measuring conditions are the same as shown in Table 2.

Example 6

Finished yarns of long fibers of polyethylene terephthalate (2,300 denier, 15 filaments) were dipped into a 5 percent aqueous solution of polyvinyl toluene sulfonic acid (sulfonation degree = 80 percent, molecular weight = 150,000). About 5 percent by weight (based on the weight of the yarns) of polyvinyl toluene sulfonic acid was mounted onto the yarns. The dipped yarns were passed through a pipe of hot air stream at 210°C. for a retention period of 60 seconds, whereby the yarns were kept tensionless. The treated yarns were then dipped into a 0.3 percent aqueous ammonia for neutralization and again passed continuously through a pipe of hot air stream at 80°C. for a retention period of 60 seconds. A carpet was woven from the yarns by a tufted machine using a jute cloth foundation of 5 gauge/32 inch, 8 stitch/inch. The experimenter put on a leather slipper and shuffled along 10 steps on the carpet retained at 25°C. in an atmosphere of 40 percent relative humidity. Immediately thereafter, the static charge voltage accumulated on the human body was measured. The static charge voltage measured by Rion static charge voltage measuring instrument was 40 (V) at a distance of 5 cm from the body. The experimenter received no electric shock when he touched a grounded metal with his finger tip. For comparison, a carpet was woven in the same way as described above except that untreated finished yarns of long fibers of polyethylene terephthalate were used. The static charge voltage accumulated on the human body as the result of the same experiment as described above was measured to be as high as 650 (V). The experimenter, when he toched a grounded metal with his finger tip, heard a discharging sound and felt a severe pain at the same time.

Table 5

| Sample | Antielectrostatic property of 6-nylon de Chine | | |
| --- | --- | --- | --- |
| | Surface resistivity ($\times 10^{10}$ ohm) | Friction static charge voltage (V) | Half-value period of friction static charge voltage (V) |
| 6-nylon de Chine of the present invention | 1.5 | 21 | 1 or less |
| After 10 cycles of washing | 2.1 | 30 | 1 or less |
| untreated 6-nylon de Chine | 1,000 or more | 20,000 or more | 120 or more |

Example 7

A shalli fabric made of polyacrylonitrile fibers, woven from two folded yarns of 60 yarn number count, both longitudinally and transversely, was dipped into a 2.5 percent aqueous solution of 80 percent sulfonated product of a copolymer of styrene and acrylic acid 2-ethyl hexyl with the ratio of 4:1. The absorbed liquid was squeezed off from the fabric (squeezing degree = 70 percent). It was then dried in air at 70°C. for 5 minutes, and subsequently subjected to heat treatment at 140°C. for 3 minutes. After the treated fabric was dipped into a 0.5 percent aqueous sodium carbonate solution at 20°C. for neutralization, it was thoroughly rinsed with water and dried in air at 70°C. for 5 minutes. The antielectrostatic property of the obtained shalli fabric of acrylonitrile was shown in Table 6. The measurement was conducted under the same condition as described in Table 2.

Table 6

| Sample | Surface resistivity ($\times 10^{10}$ ohm) | Friction static charge voltage (V) | Half-value period of friction static charge voltage (sec) |
| --- | --- | --- | --- |
| Polyacrylonitrile shalli of the present invention | 0.5 | 12 | 1 or less |
| After 10 cycles of washing | 1.2 | 21 | 1 or less |
| Untreated polyacrylonitrile shalli | 1,000 or more | 2,000 or more | 120 |

Example 8

72 Grams of sulfuric acid anhydride was added to 94 g of phenol. The sulfonation reaction was conducted at 50°C. for 2 hours to obtain phenol sulfonic acid with a sulfonation degree of 80 percent. To this sulfonated product was added 30 g of paraformaldehyde. The reaction system was heated gradually under a reduced pressure of 1 mm Hg, and condensation reaction was continued at 100°C. for 2 hours to obtain a condensate of phenol sulfonic acid-aldehyde. This product was purified in aqueous solutions and thereafter formed into a 3 percent aqueous solution.

An extruded 0.05 mm thick 6-nylon film was coated with the aqueous solution obtained above in an amount of 25 g/m². The coated film was dried in a warm air stream at 40°C, and subsequently subjected to the heat treatment at 140°C. for 60 seconds. Then, the treated film was immersed in a 0.1 percent aqueous solution of caustic soda at 20°C. for 1 minute, washed thoroughly with water and dried at 70°C. for 2 minutes. The result obtained is given in Table 7, wherein the measurement was conducted under the same condition as described in Table 1.

Table 7

| | Surface resistivity ($\times 10^{10}$ ohm) | Friction static charge voltage (V) | Half-value period of friction static charge voltage (sec) |
| --- | --- | --- | --- |
| 6-nylon film of the present invention | 0.4 | 9 | 1 or less |

Example 9

Prevention properties of the various cloths obtained in Example 3 against several contaminations, i.e., dry contamination, washing recontamination, and stain contamination were measured to obtain the result listed in Table 8. The composites of the present invention exhibit an excellent contamination preventing property and a durable characteristic thereof.

Table 8

| Sample | Degree of dry contamination (%)[12] | | Degree of washing re-contamination (%)[13] | Degree of stain contamination (%)[14] |
| --- | --- | --- | --- | --- |
| | After contamination | After cleaning | | |
| The polyester taffeta of the present invention | 66.4 | 30.7 | 20.4 | 18.5 |
| The same taffeta after 10 cycles of washing | 67.1 | 32.1 | 23.5 | 20.7 |
| The same taffeta after dry cleaning | 67.0 | 31.9 | 22.7 | 19.1 |
| Untreated polyester taffeta | 67.3 | 46.9 | 56.7 | 49.6 |

Note:
[12] measured by the method disclosed in W. H. Rees; J. Text. Inst. 53, T-230 (1962).

[13] measured by the method disclosed in Senshoku Keizai Shinbun, dated July 28, 1967.

[14] stained by two drops of crude petroleum, and, after washing, the degree of contamination was measured.

Example 10

A drop of water (about 0.05 cc) was dropped onto the cloths obtained in Example 3 by means of a burette from the height of 2 cm. The time needed for complete permeation of the water into the cloth was measured. The result is given in Table 9. The composite of the present invention exhibits an excellent water absorption property and a durable characteristic thereof.

Table 9

| Sample | The polyester taffeta of the present invention | The same tafetta after 10 cycles of washing | The same tafetta after dry cleaning | Untreated polyester taffeta |
| --- | --- | --- | --- | --- |
| Absorption time (sec) | 8 | 12 | 10 | 75 |

Example 11

The cloths obtained in Example 3 were dyed by using basic dyes such as Cathilon Yellow, 3GLH, Crystal Violet 10B, Astrozon Blue G1 or the like. While the untreated cloth was dyed only slightly, the cloth according to the present invention was dyed vividly. Moreover, the cloth according to the present invention was also vividly dyed even after 10 cycles of washing or 10 times of dry cleaning. In either case, the colour fastness was excellent. From the observation of the cross-section of the dyed cloth, it was recognized that the cloth was dyed annularly.

We claim:

1. A polymeric complex composite having an excellent antielectrostatic property as well as excellent water absorption, soil release and dyeing properties, consisting essentially of a polymeric substrate selected from natural or synthetic polymeric materials and, adhered thereon, a coating of a three-dimensional crosslinked polymer, copolymer or mixtures thereof containing as substituents free sulfonic acid groups or salts thereof and further containing sulfone bridges formed between a portion of said sulfonic acid groups and other crosslinking functional groups selected from the group consisting of aryl groups and derivatives thereof, said free sulfonic acid groups and said sulfone bridges being present in an amount of at least about 900 millimoles/kg-coating and at least about 5 millimoles/kg-coating, respectively.

2. The polymeric complex composite according to claim 1 wherein about 1350 millimoles/kg-coating of free sulfonic acid groups and about 20 millimoles/kg-coating of sulfone bridges are contained.

3. The polymeric complex composite according to claim 1 wherein a crosslinked polymer of a partially sulfonated polystyrene is used as a polymer for the coating.

4. The polymeric complex composite according to claim 1 wherein synthetic fibers of polyesters, polyamides, or polyacrylonitriles are used as substrates.

5. A polymeric complex composite according to claim 1 wherein a surface resistivity is not more than $10^{11}$ ohms even after 10 times repeated washings.

6. A polymeric complex composite according to claim 1 wherein it is easily dyed with basic dyes.

7. A method for preparing the polymeric complex composite according to claim 1, which comprises coating a polymeric substrate selected from natural or synthetic polymeric materials with a solution containing a polymer, a copolymer or mixtures thereof containing sulfonic acid groups and/or the crosslinking functional groups, drying at 0° – 120°C. for several seconds to several hours, and, after drying, subjecting the coating substrate to heat treatment at 80° – 300°C. for several seconds to several hours, to thereby effect crosslinking.

8. Articles or end products formed in shapes such as sheets, rods, strands, or in various molded or extruded shapes made from the polymeric complex composite according to claim 1.

9. The polymeric complex composite according to claim 1, wherein the crosslinked polymer of said coating is an addition polymer or a condensation polymer of a sulfonic acid containing monomer and a monomer having the crosslinking groups.

10. The polymeric complex composite according to claim 9, wherein the crosslinked polymer is an addition polymer of a sulfonic acid containing monomer selected from the group consisting of vinyl sulfonic acid, methallyl sulfonic acid, 2-sulfoethyl methacrylate, styrene sulfonic acid, vinyl toluene sulfonic acid and their ester and amide derivatives, and a crosslinking group containing monomer selected from the group consisting of sytrene, vinyl toluene, α-methylstyrene, ar-dimethyl styrene, ar-ethyl styrene, ar-hydroxy styrene, ar-amino styrene, vinyl naphthalene, ar-sec-butyl styrene, and ar-trimethyl styrene and the halo, nitrilo, carboxyl and keto derivatives thereof.

11. The polymeric complex composite according to claim 9, wherein the crosslinked polymer of the coating is a condensation polymer of a sulfonic acid containing monomer selected from the group consisting of phenol sulfonic acid, benzaldehyde-2,4-disulfonic acid, naphthol sulfonic acid and p-oxybenzyl sulfonic acid and a crosslinking group containing monomer selected from the group consisting of phenol, resorcinol, hydroquinone, cresol and thiophenol.

12. The polymeric complex composite according to claim 1, wherein the substrate is selected from the group consisting of polyethylene, polypropylene, polyisobutylene, polystyrene, polyxylene, unsaturated polyesters, polyvinyl chloride, polyvinylidene chloride, polyvinyl fluoride, polyacrylic acid esters, polyethers, polycarbonates, epoxy resins, urea resins, phenol resins, silicone resins, ABS resins, polyamides, polyacrylonitrile, vinyl chloride-vinyl acetate copolymers, polyesters, cellulose, cellulose acetate, wool, casein, and regenerated cellulose.

13. A method for preparing a polymeric laminate consisting essentially of a polymeric substrate selected from natural or synthetic polymeric materials and adhered thereon a coating of a three-dimensional polymer, copolymer or mixtures thereof containing as substituents free sulfonic acid groups or salts thereof and further containing sulfone bridges formed between a portion of said sulfonic acid groups and other crosslinking functional groups selected from the group consisting of aryl groups and derivatives thereof, said free sulfonic acid groups being present in an amount of at least about 900 millimoles per kg-coating and said sulfone bridges being present in the amount of at least about 5 millimoles per kg-coating and which exhibits a surface resistivity of not more than $10^{11}$ ohms, which comprises coating a polymeric substrate selected from natural or synthetic polymeric materials with a solution containing a polymer, a copolymer or mixtures thereof containing sulfonic acid groups and the crosslinking groups, drying the coated substrate at 0° to 120°C. for several seconds to several hours, and after drying subjecting the coated substrate to a heat treatment at 80° to 300°C. for several seconds to several hours to thereby effect crosslinking of said coating, contacting the crosslinked coating with an electrolyte substance containing metal ions, ammonium ions or amino ions, to remove the hydrogen ions of the acid group which are not crosslinked.

14. The polymeric complex composite according to claim 11, which further contains an effective amount of a coupling agent for the monomer selected from the group consisting of formaldehyde, acetaldehyde, glyoxal, benzaldehyde and trioxane.

15. A polymeric complex composite having an excellent antielectrostatic property as well as excellent water absorption, soil release and dyeing properties, consisting essentially of a polymeric substrate selected from natural or synthetic polymeric materials and adhered thereon, a coating of a three-dimensional crosslinked sulfonated polymer, copolymer or mixtures thereof which contains at least about 5 millimoles per kg-coating of crosslinked sulfone bridges formed between sulfonic acid groups and crosslinking functional groups selected from the group consisting of aryl groups and derivatives thereof, at least about 900 millimoles per kg-coating of free sulfonic acid groups or salts thereof, and other substituent groups selected from the group consisting of halogen, nitrile, carboxylic acid, carboxylic acid ester, and ketones.

16. The polymeric complex composite according to claim 15, wherein the other substituent groups other than the sulfonic acid groups and crosslinking groups are present in an amount within the relative numerical limitations for the ratios of the groups expressed by the following formulas:

$$\alpha = X/X + Y = 0.05 - 0.95$$

$$\beta = X + Y/X + Y + Z = 0.10 - 1.00$$

wherein,

X represents the number of said chains having a sulfonic acid group,

Y represents the number of crosslinking groups, and

Z represents the number of other substituent groups.

17. A polymeric complex composite according to claim 16, wherein $\alpha$ is 0.30 to 0.90 and $\beta$ is 0.80 to 0.90.

18. The polymeric complex composite according to claim 1, wherein the crosslinked polymer of said coating is formed from monomers capable of being attached with sulfonic acid groups after polymerization, selected from the group consisting of styrene, $\alpha$-methylstyrene, vinyl toluene, and vinyl naphthalene.

19. The polymeric complex composite according to claim 18, wherein the crosslinked coating is formed from partially sulfonated polystyrene.

20. The polymeric complex composite according to claim 1, wherein the polymeric substrate is polyethylene terephthalate and the three-dimensionally crosslinked coating is formed from polystyrene sulfonic acid having a degree of sulfonation of 78 percent by molar ratio of the sulfonated benzene rings.

21. The polymeric complex composite according to claim 1, wherein the crosslinked polymer is an addition polymer of vinyl sulfonic acid and styrene.

* * * * *